US012631984B2

(12) United States Patent
Yoshikawa

(10) Patent No.: US 12,631,984 B2
(45) Date of Patent: May 19, 2026

(54) IMAGE FORMING DEVICE

(71) Applicant: SHARP KABUSHIKI KAISHA, Sakai City (JP)

(72) Inventor: Yoshihiro Yoshikawa, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/019,040

(22) Filed: Jan. 13, 2025

(65) Prior Publication Data

US 2025/0246077 A1 Jul. 31, 2025

(30) Foreign Application Priority Data

Jan. 31, 2024 (JP) ................................ 2024-012714

(51) Int. Cl.
*G03G 15/01* (2006.01)
*G03G 15/16* (2006.01)
(Continued)

(52) U.S. Cl.
CPC ..... *G03G 15/0136* (2013.01); *G03G 15/0131* (2013.01); *G03G 15/0142* (2013.01); *G03G 15/0189* (2013.01); *G03G 15/1605* (2013.01); *G03G 15/161* (2013.01); *G03G 15/1615* (2013.01); *G03G 15/162* (2013.01); *G03G 15/1685* (2013.01); *G03G 21/16* (2013.01); *G03G 21/1604* (2013.01);
(Continued)

(58) Field of Classification Search
CPC ........... G03G 15/0131; G03G 15/0136; G03G 15/0142; G03G 15/0189; G03G 15/1605; G03G 15/161; G03G 15/1615; G03G 15/162; G03G 15/1685; G03G 21/16; G03G 21/1604; G03G 21/1619; G03G 21/1647; G03G 21/168; G03G 2215/0193; G08G 1/20; G08G 1/0962
See application file for complete search history.

(56) References Cited

U.S. PATENT DOCUMENTS

2020/0201208 A1 6/2020 Kouzu
2023/0042229 A1* 2/2023 Nakamura ......... G03G 15/1615
(Continued)

FOREIGN PATENT DOCUMENTS

JP 2013-167788 A 8/2013
JP 2020-101591 A 7/2020

*Primary Examiner* — Joseph S Wong
(74) *Attorney, Agent, or Firm* — ScienBiziP, P.C.

(57) ABSTRACT

An image forming device includes: a plurality of photoreceptors; a device main body; and an intermediate transfer unit attachable to and detachable from the device main body, wherein the intermediate transfer unit includes an intermediate transfer belt stretched across a plurality of rollers, a color transfer roller and a monochrome transfer roller, a lever operated by a user, and a monochrome oscillation mechanism that oscillates the monochrome transfer roller, the intermediate transfer belt is switchable between a color image forming state, a monochrome image forming state, and a separated state the monochrome oscillation mechanism switches between the monochrome image forming state and the separated state when the lever is operated, and the device main body is provided with a regulator that regulates removal of the intermediate transfer unit in the monochrome image forming state.

6 Claims, 7 Drawing Sheets

(51) Int. Cl.
*G03G 21/16* (2006.01)
*G08G 1/00* (2006.01)
*G08G 1/0962* (2006.01)

(52) U.S. Cl.
CPC ..... *G03G 21/1619* (2013.01); *G03G 21/1647* (2013.01); *G03G 21/168* (2013.01); *G03G 2215/0193* (2013.01); *G08G 1/0962* (2013.01); *G08G 1/20* (2013.01)

(56) References Cited

U.S. PATENT DOCUMENTS

2023/0144792 A1* 5/2023 Itoh .................... G03G 21/1647
399/53
2024/0142898 A1* 5/2024 Yoshikawa ........ G03G 15/0136

* cited by examiner

IMAGE FORMING DEVICE

CROSS-REFERENCE TO RELATED APPLICATION

The present application claims priority from Japanese Application JP2024-012714, the content to which is hereby incorporated by reference into this application.

BACKGROUND OF THE DISCLOSURE

1. Field of the Disclosure

The disclosure relates to an image forming device including an intermediate transfer unit attachable to and detachable from a device main body.

2. Description of the Related Art

In an image forming device including a plurality of photoreceptors (for example, photoreceptor drums) and an intermediate transfer belt such as, for example, a tandem-type color (multicolor) image forming device, toner images formed on the photoreceptors are sequentially transferred onto the rotating intermediate transfer belt from an upstream side toward a downstream side (primary transfer). Further, in a color image forming device, when a monochrome (single color) image is formed, only one photoreceptor may be caused to abut against the intermediate transfer belt and the other photoreceptors may be separated from the intermediate transfer belt.

In image forming devices, configurations are adopted that include internal devices such as an intermediate transfer unit, which combines certain members including an intermediate transfer belt, making it possible to remove the internal devices from a device main body during maintenance work on the internal devices.

SUMMARY OF THE DISCLOSURE

A known image forming device includes a device housing; a plurality of photoreceptor drums detachable from and arranged in parallel with the device housing; a transfer belt unit detachable from the device housing and including a transfer belt suspended across a plurality of rollers and circularly movable, facilitating a change in position of a belt posture between a first posture of coming into contact with all of the plurality of photoreceptor drums, a second posture of coming into contact with only one of the plurality of photoreceptor drums, and a third posture of not coming into contact with any of the plurality of photoreceptor drums, and a belt position control mechanism that controls the changing of the position of the belt posture of the transfer belt; an access member provided in the device housing and opened and closed when the plurality of photoreceptor drums are attached to or detached from the device housing; a lock lever that locks this access member; and an interlocking mechanism that engages with the lock lever on one end and the belt position control mechanism on the other end, and controls the belt position control mechanism, changing the position of the posture of the transfer belt to the third posture in conjunction with the unlocking of the lock lever.

Further, a known image forming device includes a plurality of process units, each including a photoreceptor and a charger and a developer for forming a toner image on the photoreceptor; a transfer unit including a transfer belt wound in an endless shape and disposed facing the plurality of process units; a tension application member that applies tension to the transfer belt; a position switching member that can abut against and separate from the transfer belt, switching the position of the transfer belt relative to the photoreceptor; a support member provided in the vicinity of an end portion of the transfer belt in a longitudinal direction of the photoreceptor and capable of moving in conjunction with the position switching member; an operation member for moving the position switching member; and a control unit for causing the support member to support the transfer belt when the position switching member is separated from the transfer belt in conjunction with the moving operation of the operation member.

The image forming devices described above are each provided with an operation member, a lock lever, and the like that are operated when the photoreceptors and the transfer belt are to be separated from each other. However, when the transfer unit and the like are removed without operating these, the photoreceptors and the transfer belt may be rubbed against each other, resulting in both being damaged.

The disclosure has been made to solve the above-described problems, and an object of the disclosure is to provide an image forming device capable of regulating removal of an intermediate transfer unit and preventing a forgotten operation by the user.

According to an embodiment of the disclosure, an image forming device includes a plurality of photoreceptors, a device main body, and an intermediate transfer unit attachable to and detachable from the device main body by being inserted into and removed from the device main body in an insertion and removal direction. The intermediate transfer unit includes an intermediate transfer belt stretched across a plurality of rollers, a color transfer roller and a monochrome transfer roller that are disposed along an inner periphery of the intermediate transfer belt and, when oscillated, press and cause the intermediate transfer belt to abut against each corresponding photoreceptor of the plurality of photoreceptors, a lever operated by a user, and a monochrome oscillation mechanism that oscillates the monochrome transfer roller. The intermediate transfer belt is switchable between a color image forming state of abutting against all of the corresponding photoreceptors, a monochrome image forming state of abutting against a photoreceptor of the plurality of photoreceptors corresponding to the monochrome transfer roller, and a separated state of being separated from all of the plurality of photoreceptors. The monochrome oscillation mechanism switches between the monochrome image forming state and the separated state when the lever is operated, and the device main body is provided with a regulator that regulates removal of the intermediate transfer unit in the monochrome image forming state.

The image forming device according to the disclosure may include a color oscillation mechanism that oscillates the color transfer roller, and the color oscillation mechanism may switch to the color image forming state at the time of color image formation and switch to the monochrome image forming state when the color image formation is completed.

In the image forming device according to the disclosure, the monochrome oscillation mechanism may include a regulatee that faces the regulator in the insertion and removal direction in the monochrome image forming state, and the regulatee may move to a position not overlapping the regulator in the insertion and removal direction when the monochrome image forming state transitions to the separated state.

In the image forming device according to the disclosure, the intermediate transfer unit may include a pre-transfer roller disposed along the inner periphery of the intermediate transfer belt, and the monochrome oscillation mechanism may oscillate the pre-transfer roller in conjunction with the monochrome transfer roller.

In the image forming device according to the disclosure, the lever may be operated and move in the insertion and removal direction.

The image forming device according to the disclosure may include an access cover that opens and closes a side surface of the device main body and faces the intermediate transfer unit in the insertion and removal direction, and a lock that locks the lever to maintain the monochrome image forming state, and the lever may interfere with the access cover to be closed and prevent the closing of the access cover in a state of not being locked by the lock.

According to the disclosure, a monochrome transfer roller is operated by a user via a lever, and thus a forgotten operation by a user can be prevented by regulation of removal of an intermediate transfer unit by a regulator. This makes it possible to prevent an intermediate transfer belt and a photoreceptor from being damaged by the intermediate transfer unit being removed while the intermediate transfer belt abuts against the photoreceptor.

DETAILED DESCRIPTION OF THE DISCLOSURE

An image forming device according to an embodiment of the disclosure will be described below with reference to the accompanying drawings.

Figure 1:
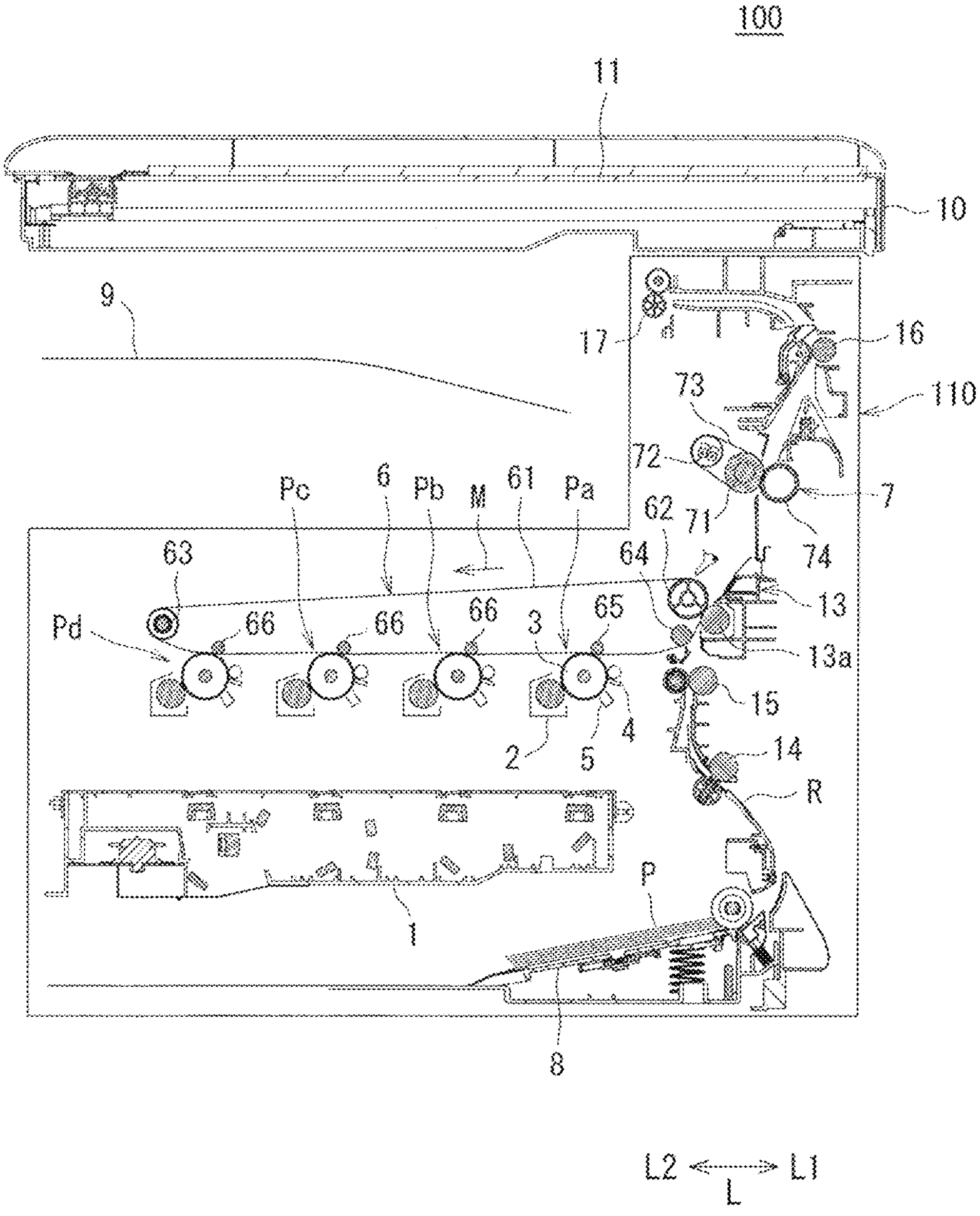
FIG. 1 is a schematic cross-sectional view illustrating a configuration of an image forming device according to an embodiment of the disclosure.

FIG. 1 is a schematic cross-sectional view illustrating a configuration of the image forming device according to the embodiment of the disclosure.

An image forming device 100 is a multi-function printer having a copy function, a scanner function, a facsimile function, and a printer function. The image forming device 100 transmits an image of a document read by an image reading device 10 to an external device, and forms an image of the document read by the image reading device 10 or an image received from the external device in color or in a single color on a recording medium such as a sheet.

A document table 11 is provided on an upper side of the image reading device 10, and the image reading device 10 reads a document placed on the document table 11 and generates image data.

The image forming device body 100 includes an optical scanning device 1, a development device 2, a photoreceptor drum 3 (one example of a photoreceptor), a drum cleaning device 4, a charger 5, an intermediate transfer belt unit 6, a secondary transfer device 13, a fixing device 7, a feed tray 8, a discharge tray 9, and the like.

The image forming device 100 handles image data corresponding to a color image composed of the colors black (K), cyan (C), magenta (M), and yellow (Y), or a monochrome image composed of a single color (black, for example). The image forming device 100 is provided with four sets of the development device 2, four sets of the photoreceptor drum 3, four sets of the drum cleaning device 4, and four sets of the charger 5 that form four types of toner images, with the sets respectively serving as four image stations Pa, Pb, Pc, Pd corresponding to the colors black, cyan, magenta, and yellow, respectively.

The optical scanning device 1 exposes a front surface of the photoreceptor drum 3 to form an electrostatic latent image. The development device 2 develops the electrostatic latent image on the front surface of the photoreceptor drum 3 to form a toner image on the front surface of the photoreceptor drum 3. The drum cleaning device 4 removes and collects residual toner on the front surface of the photoreceptor drum 3. The charger 5 uniformly charges the front surface of the photoreceptor drum 3 to a predetermined potential. With this series of operations, a toner image of each color is formed on the front surface of each photoreceptor drum 3.

The intermediate transfer unit 6 includes an intermediate transfer belt 61 having an endless shape, an intermediate transfer driving roller 62, an intermediate transfer driven roller 63, a pre-transfer roller 64, and a plurality of intermediate transfer rollers (monochrome transfer roller 65 and color transfer rollers 66). Note that details of the intermediate transfer unit 6 will be described with reference to FIG. 2 described below.

The intermediate transfer belt 61 is stretched over the intermediate transfer driving roller 62 and the intermediate transfer driven roller 63, and rotates in a rotation direction M. In the image forming device 100, the toner images of the respective colors formed on the front surfaces of the respective photoreceptor drums 3 are sequentially transferred and superimposed on a front surface of the intermediate transfer belt 61 to form color toner images.

The intermediate transfer rollers are provided at four locations along an inner periphery of the intermediate transfer belt 61, allowing four types of toner images corresponding to the respective colors to be formed. The intermediate transfer rollers apply pressure, causing the intermediate transfer belt 61 to abut against the photoconductor drums 3, transferring the toner images of the respective colors formed on the front surfaces of the photoreceptor drums 3 to the intermediate transfer belt 61 that rotates.

Among the four image stations Pa, Pb, Pc, Pd described above, the image station Pa is disposed at a position closest to the intermediate transfer driving roller 62 and corresponds to black. Among the four intermediate transfer rollers, the monochrome transfer roller 65 corresponds to the image station Pa, and the three color transfer rollers 66 correspond to the image stations Pb, Pc, Pd. The pre-transfer roller 64 is disposed between the monochrome transfer roller 65 and the intermediate transfer driving roller 62 and immediately upstream of the intermediate transfer driving roller 62.

In the secondary transfer device 13, a sheet conveyed along a sheet conveying path R is transported while being nipped at a transfer nipper between a secondary transfer roller 13*a* and the intermediate transfer belt 61. When the sheet passes through the transfer nipper, a toner image on the front surface of the intermediate transfer belt 61 is transferred to the sheet, and the sheet is conveyed to the fixing device 7. The secondary transfer roller 13*a* abuts against a portion of the intermediate transfer belt 61 stretched between the pre-transfer roller 64 and the intermediate transfer driving roller 62.

The fixing device 7 includes a fixing belt 73 stretched over a fixing roller 71 and a heating roller 72, and a pressure roller 74 that presses the fixing roller 71 with the fixing belt 73 interposed therebetween. The heating roller 72 includes a heat source and heats the fixing belt 73. In the fixing device 7, the sheet with the transferred toner image is nipped by a nipper between the fixing belt 73 and the pressure roller 74 and subject to heat and pressure to fix the toner image onto the sheet.

The feed tray 8 is a tray for stacking recording media (sheets) used in image formation, and is provided downward of the optical scanning device 1. The sheet is pulled out from the feed tray 8 and conveyed to the sheet conveying path R.

Sheet conveying rollers 14, registration rollers 15, post-fixing conveying rollers 16, and discharge rollers 17 are disposed along the sheet conveying path R. The conveying rollers 14 convey the sheet fed from the feed tray 8 to the registration rollers 15. The registration rollers 15 are provided between the feed tray 8 and the secondary transfer device 13, and adjusts a conveyance timing of the sheet, ensuring that the toner image is transferred to the sheet by the secondary transfer device 13. For example, the registration rollers 15 are made to wait (temporarily stop) while the sheet conveyed from the sheet feed tray 8 is nipped, and start conveying the sheet at a constant speed in synchronization with the secondary transfer device 13. The sheet having passed through the secondary transfer device 13 and the fixing device 7 is conveyed to the discharge rollers 17 by the post-fixing conveying rollers 16, and is discharged to the discharge tray 9 by the discharge rollers 17.

In the image forming device 100, the intermediate transfer unit 6 is attachable to and detachable from the device main body by being inserted into and removed from the device main body in an insertion and removal direction L (left-right direction in FIG. 1). Then, in the image forming device 100, an access cover 110 is provided on a side surface (right side surface in FIG. 1) facing the intermediate transfer unit 6 attached to the device main body in the insertion and removal direction L. When the intermediate transfer unit 6 is attached or detached, the access cover 110 is opened by a user. Hereinafter, for the sake of description, with respect to the insertion and removal direction L, a direction in which the intermediate transfer unit 6 attached to the device main body is removed (right direction in FIG. 1) may be referred to as a removal direction L1, and a direction in which the intermediate transfer unit 6 is inserted into the device main body from the outside (left direction in FIG. 1) may be referred to as an insertion direction L2.

Figure 2:
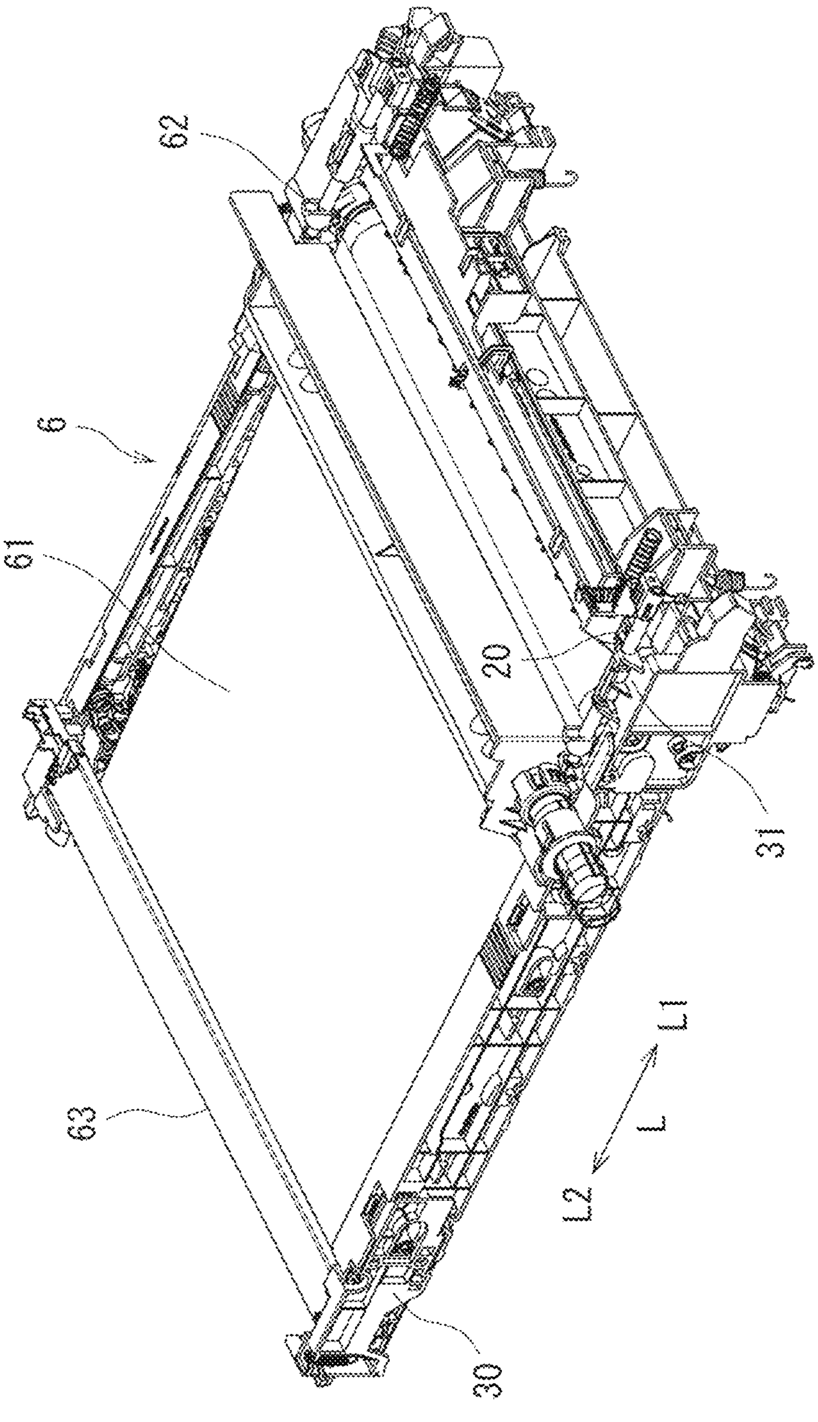
FIG. 2 is a perspective view illustrating an intermediate transfer unit.

FIG. 2 is a perspective view illustrating the intermediate transfer unit. Note that, hereinafter, a positional relationship of the intermediate transfer unit 6 will be described on the basis of a state of being attached to the device main body.

The intermediate transfer unit 6 includes a pair of unit frames 30 that support both end portions of the intermediate transfer driving roller 62 and the intermediate transfer driven roller 63. In the intermediate transfer unit 6, the intermediate transfer driving roller 62 is disposed at an end portion on the removal direction L1 side, and the intermediate transfer driven roller 63 is disposed at an end portion on the insertion direction L2 side. Note that, in the intermediate transfer unit 6, rollers other than the intermediate transfer driving roller 62 and the intermediate transfer driven roller 63 may be provided, and the other rollers may be supported by the unit frames 30.

Frame holders 31 are provided at end portions of the unit frames 30 on the removal direction L1 side, and levers 20 are attached to the frame holders 31. The lever 20 is a portion operated by the user, and a detailed structure thereof will be described with reference to FIG. 3 and FIG. 4 described below. The lever 20 is provided on each of the pair of unit frames 30, but both have substantially the same structure and are operated in the same manner. Therefore, hereinafter, the structure of one lever 20 will be described, and the description of the other lever 20 will be omitted.

Figure 3:
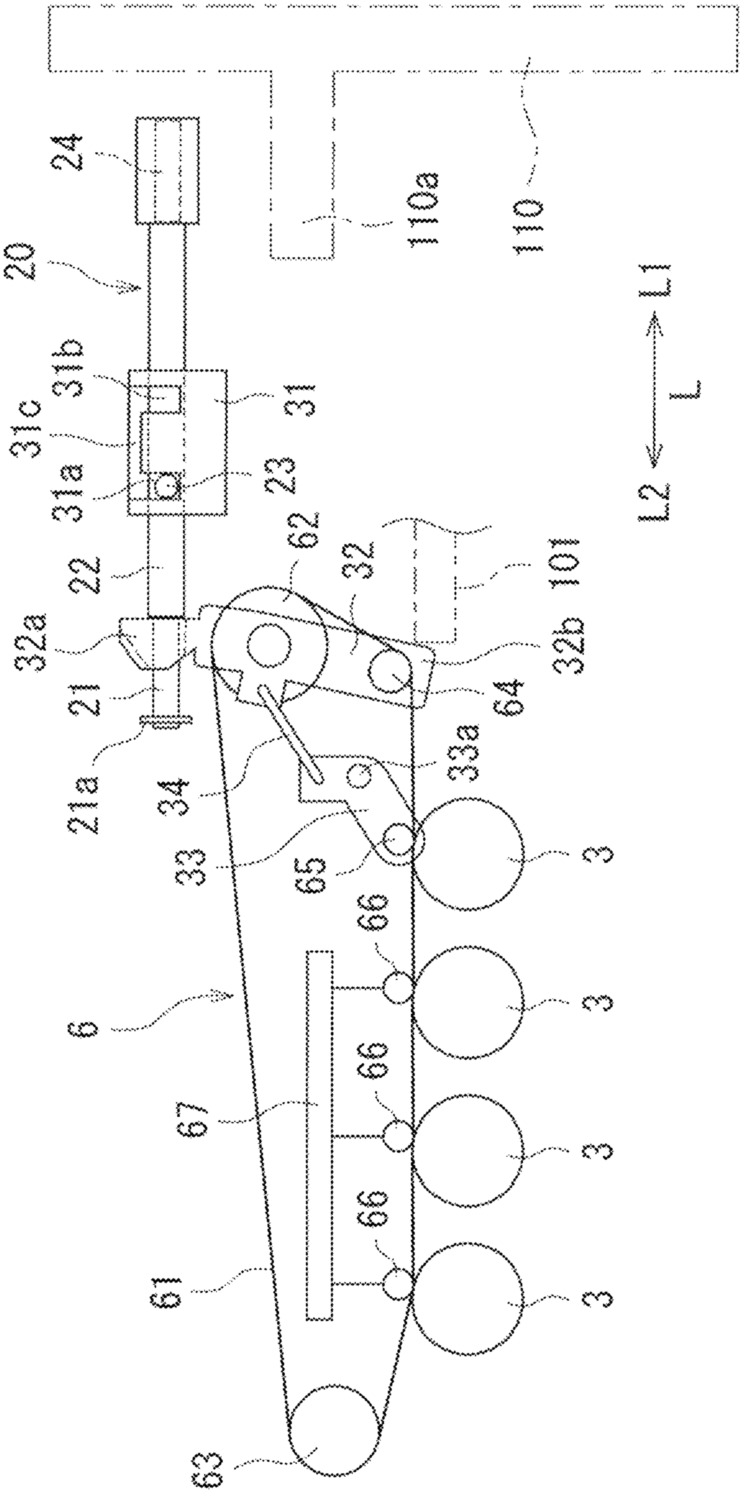
FIG. 3 is a schematic side view illustrating a structure in the vicinity of the intermediate transfer unit.
Figure 4:
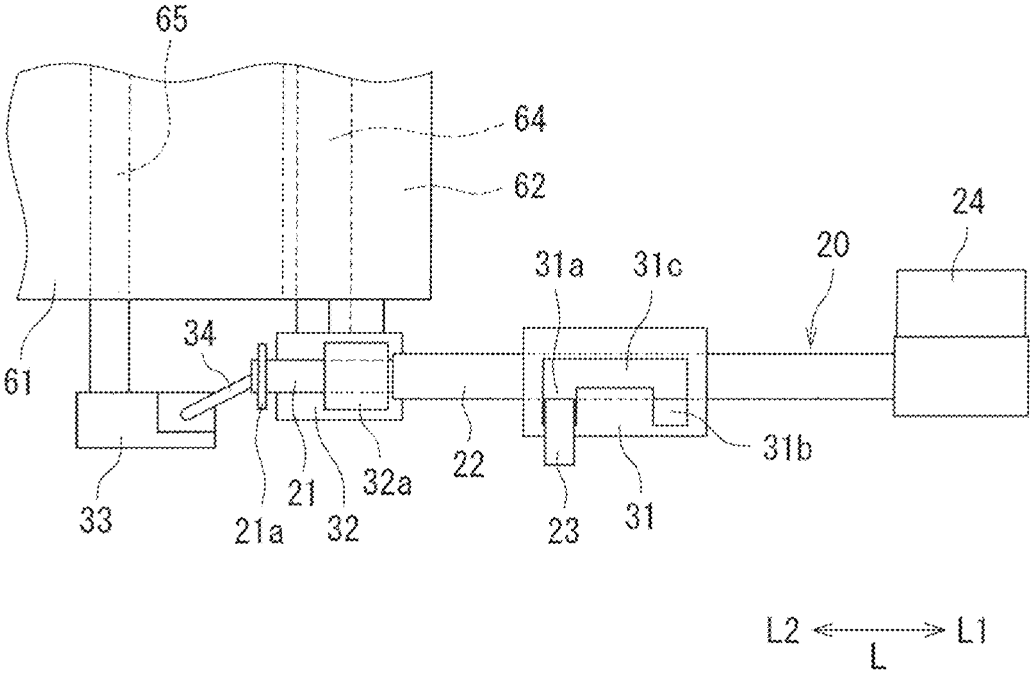
FIG. 4 is an enlarged top view illustrating the vicinity of a lever in FIG. 3.

FIG. 3 is a schematic side surface view illustrating a structure in the vicinity of the intermediate transfer unit, and FIG. 4 is an enlarged top view illustrating the vicinity of the lever in FIG. 3. Note that, in FIG. 3 and FIG. 4, in consideration of visibility of the drawings, the image forming device 100 and the intermediate transfer unit 6 are partially extracted and illustrated, and portions other than the frame holder 31 of the unit frame 30, portions other than the photoreceptor drum 3 of the image station, and the like are omitted.

In a state of attachment to the device main body, the intermediate transfer unit 6 is positioned upward of the four image stations Pa, Pb, Pc, Pd, and the photoreceptor drums 3 in the four image stations Pa, Pb, Pc, Pd are positioned downward of the intermediate transfer belt 61. Hereinafter, for the sake of description, a surface of the intermediate transfer belt 61 facing the photoreceptor drums 3 may be called a lower surface.

Figure 5:
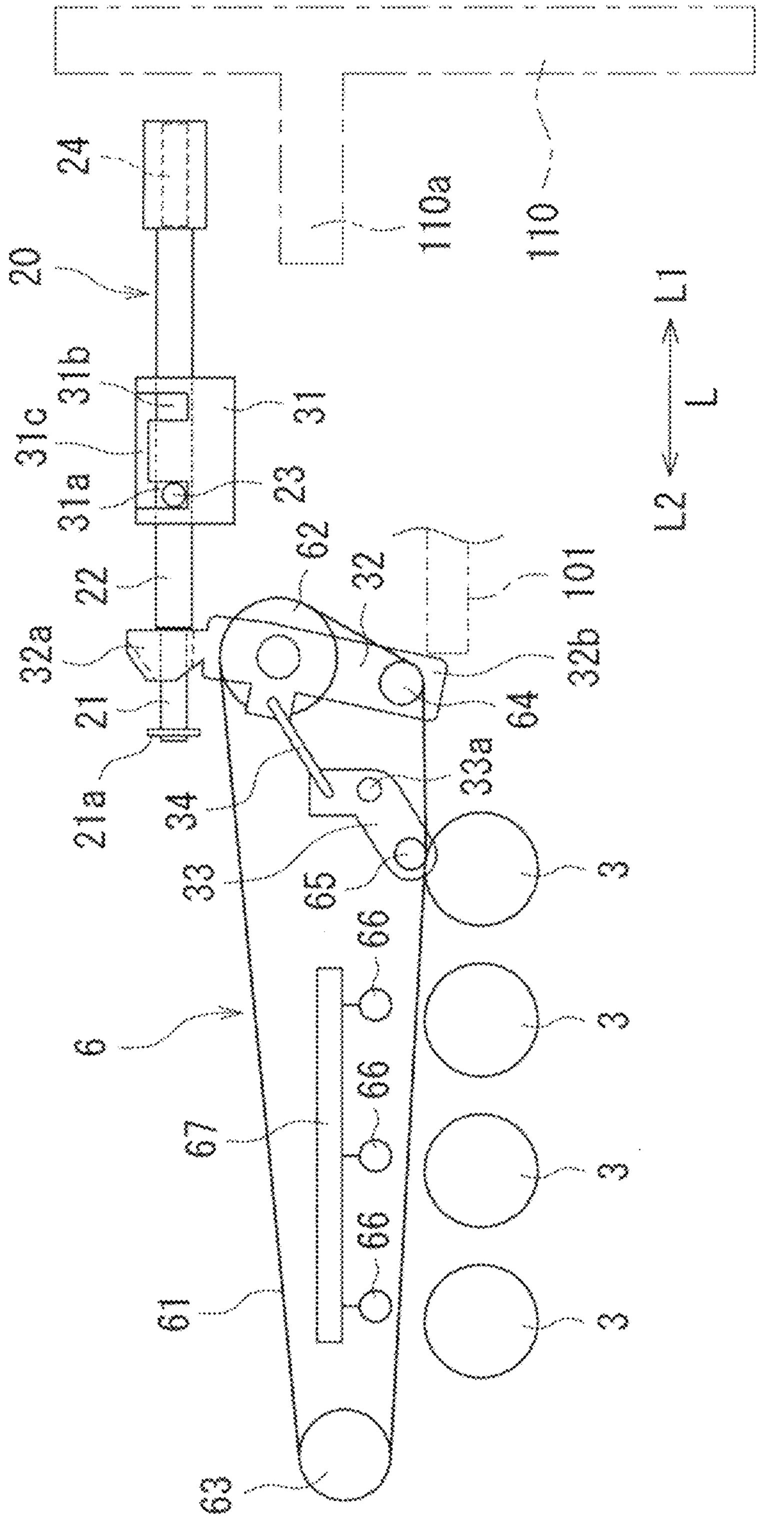
FIG. 5 is a schematic side view illustrating a structure in the vicinity of the intermediate transfer unit in a monochrome image forming state.

The intermediate transfer unit 6 is provided with a color oscillation mechanism 67 that oscillates the three color transfer rollers 66. Upon receiving an instruction from a controller of the image forming device 100, the color oscillation mechanism 67 oscillates the color transfer rollers 66 downward. When the color transfer rollers 66 are oscillated downward, the intermediate transfer belt 61 is pressed by the color transfer rollers 66, and the lower surface side spreads downward and abuts against the three photoreceptor drums 3 provided downward of the three color transfer rollers 66. Further, when an instruction from the controller of the image forming device 100 is received, the color oscillation mechanism 67 oscillates the color transfer rollers 66 upward as illustrated in FIG. 5 described below. Note that the color oscillation mechanism 67 may include a sensor that detects whether the color transfer rollers 66 are oscillated upward or downward.

The intermediate transfer unit 6 is provided with a monochrome oscillation mechanism that oscillates the monochrome transfer roller 65, and the levers 20 operated by the user when the monochrome oscillation mechanism is to be operated. The monochrome oscillation mechanism is constituted by a first oscillation member 32, a second oscillation member 33, and an interlocking member 34.

The first oscillation member 32 is attached to an end portion of a rotary shaft of the intermediate transfer driving roller 62, and rotates with the rotary shaft of the intermediate transfer driving roller 62 as a fulcrum. Note that the first oscillation member 32 is not fixed to the rotary shaft of the intermediate transfer driving roller 62, and the first oscillation member 32 does not rotate even if the intermediate transfer driving roller 62 rotates when the intermediate transfer belt 61 rotates. An upper end of the first oscillation member 32 is provided with an oscillation connector 32*a* to which a tip end of the lever 20 is attached. A hole extending through the oscillation connector 32*a* in the insertion and removal direction L is formed in the oscillation connector 32*a*, and the tip end (thin-diameter portion 21) of the lever 20 is inserted, penetrating the hole.

Figure 7:
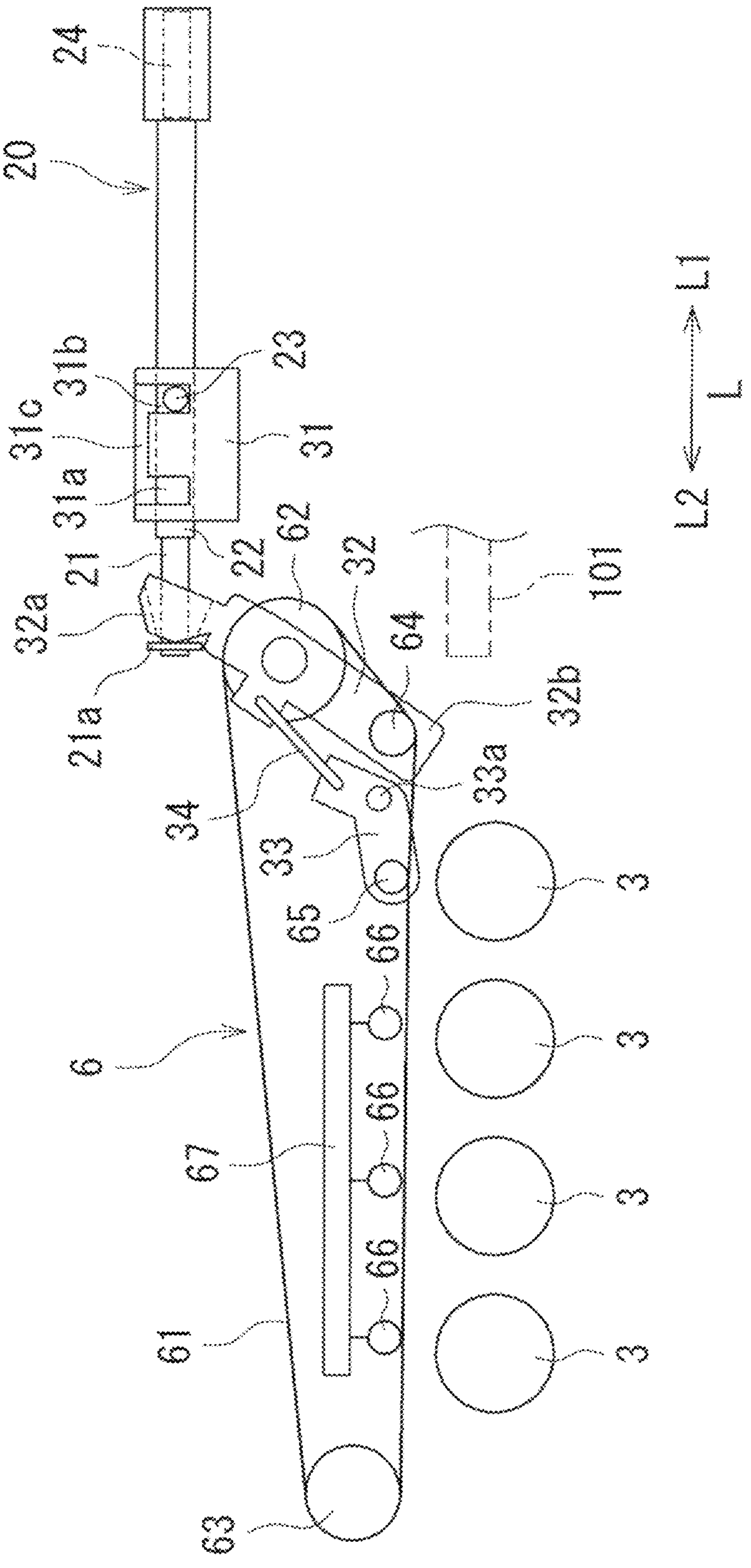
FIG. 7 is a schematic side view illustrating the structure in the vicinity of the intermediate transfer unit in the separated state.

An end portion of the pre-transfer roller 64 is rotatably supported on a lower end side of the first oscillation member 32. As illustrated in FIG. 7 described below, when the first oscillation member 32 rotates, the pre-transfer roller 64 oscillates up and down, and FIG. 3 illustrates a state in which the pre-transfer roller 64 oscillates downward. When the pre-transfer roller 64 oscillates downward, the intermediate transfer belt 61 is pressed by the pre-transfer roller 64, and the lower surface side is pressed and spread downward.

The lower end of the first oscillation member 32 is a regulatee 32*b* and, in a state in which the pre-transfer roller 64 is oscillated downward, the regulatee 32*b* is adjacent, in the insertion and removal direction L, to a regulator 101 provided in a portion of the device main body. Note that a rotation range of the first oscillation member 32 provides a slight clearance between the regulatee 32*b* and the regulator 101 when the pre-transfer roller 64 is oscillated downward.

The second oscillation member 33 is provided with a frame shaft supporter 33*a* pivotably supported on the unit frame 30, and rotates with the frame shaft supporter 33*a* as a fulcrum. An end portion of the monochrome transfer roller 65 is pivotably supported on a lower end side of the second oscillation member 33. As illustrated in FIG. 7 described below, when the second oscillation member 33 rotates, the monochrome transfer roller 65 oscillates up and down, and FIG. 3 illustrates a state in which the monochrome transfer roller 65 is oscillated downward. When the monochrome transfer roller 65 oscillates downward, the intermediate transfer belt 61 is pressed by the monochrome transfer roller 65, and the lower surface side is pressed and spread downward and abuts against the photoreceptor drum 3 provided downward of the monochrome transfer roller 65.

One end of the interlocking member 34 is attached to an upper end of the second oscillation member 33, and the other end of the interlocking member 34 is attached to the first oscillation member 32. When the first oscillation member 32 rotates, the second oscillation member 33 is pulled by the interlocking member 34 and rotates in conjunction with the first oscillation member 32.

The second oscillation member 33 may be equipped with a biasing member that applies force in a direction opposite to the pulling direction of the interlocking member 34 and, in a state without a load applied from the interlocking member 34, may bias and oscillate the monochrome transfer roller 65 downward.

The monochrome oscillation mechanism is not limited to the configuration including the first oscillation member 32, the second oscillation member 33, and the interlocking member 34 as described above, and may oscillate the pre-transfer roller 64 and the monochrome transfer roller 65 together in the same direction.

Figure 6:
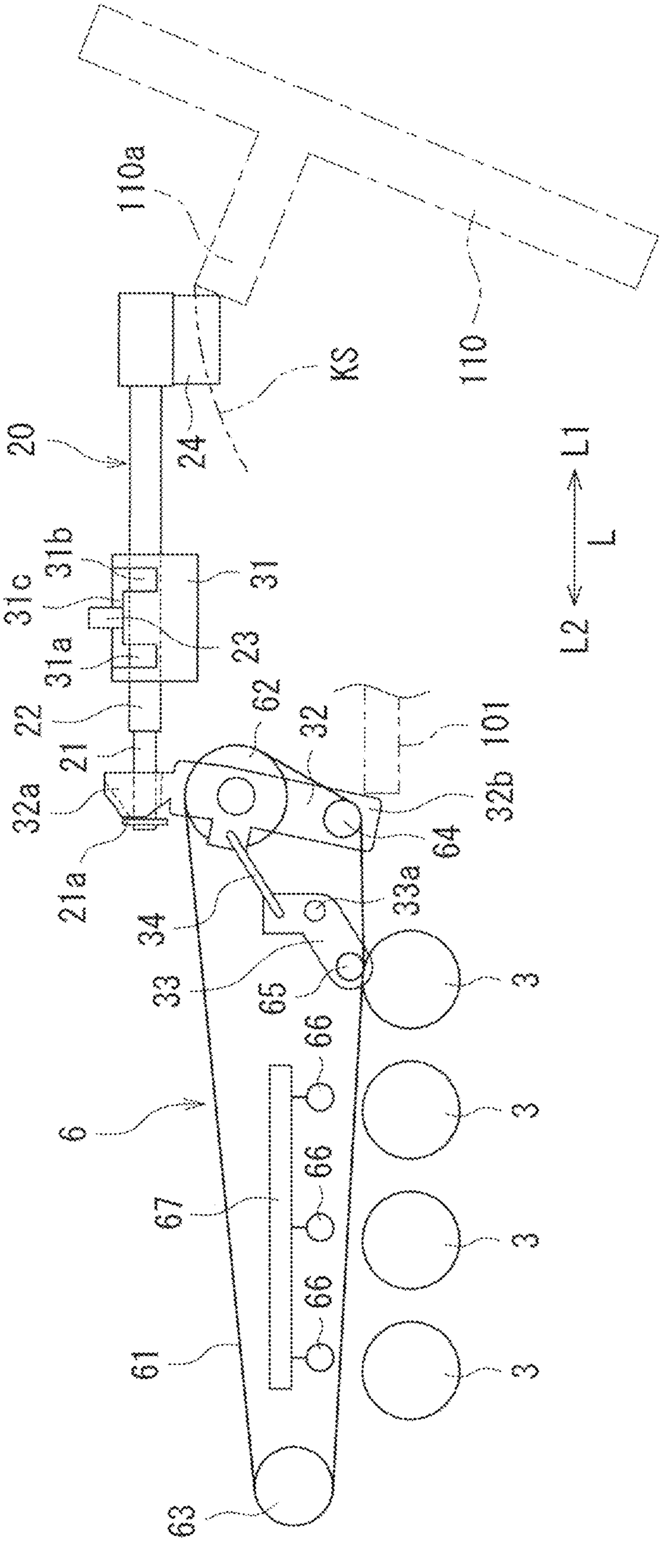
FIG. 6 is a schematic side view illustrating the structure in the vicinity of the intermediate transfer unit during transition from the monochrome image forming state to a separated state.

As described above, the tip end of the lever 20 on the insertion direction L2 side is attached to the oscillation connector 32*a*. The tip end side of the lever 20 in the insertion direction L2 is the thin-diameter portion 21 that is thinner than a hole provided in the oscillation connector 32*a*, and a ring 21*a* having an outer diameter larger than that of the hole is fitted into the tip end that protrudes deeper than the oscillation connector 32*a*. As illustrated in FIG. 6 described below, when the lever 20 is pulled in the removal direction L1, the ring 21*a* is caught by the oscillation connector 32*a*. A thick-diameter portion 22 thicker than the hole provided in the oscillation connector 32*a* is provided on the insertion and removal direction L side of the thin-diameter portion 21. When the lever 20 is pressed in the insertion direction L2, the thick-diameter portion 22 is caught by the oscillation connector 32*a*.

In the present embodiment, a length of the thin-diameter portion 21 in the insertion and removal direction L is longer than that of the oscillation connector 32*a*. In the state illustrated in FIG. 3, the thick-diameter portion 22 abuts against the oscillation connector 32*a*, and a clearance (play) is provided between the oscillation connector 32*a* and the ring 21*a*. Then, as illustrated in FIG. 6 described below, when the lever 20 is slightly pulled in the removal direction L1, the ring 21*a* abuts against the oscillation connector 32*a* and acts, causing the first oscillation member 32 to rotate. Thus, in the configuration in which the lever 20 is attached to the first oscillation member 32 with a gap therebetween, the rotation range of the first oscillation member 32 can be adjusted, making the range different with respect to an operation distance of the lever 20.

The lever 20 includes a shaft having a cylindrical shape and extending in the insertion and removal direction L, and an intermediate portion (thick-diameter portion 22) of the shaft is held by the frame holder 31. The frame holder 31 locks the lever 20 via a pin 23 provided at the lever 20 and, in a state in which the frame holder 31 is not locked, the lever 20 can be inserted and removed in the insertion and removal direction L. Further, the lever 20 is held by the frame holder 31 rotatably about an axis thereof, and by rotating the lever 20, it is possible to switch between a state of being locked to the frame holder 31 (locked state) and a state of not being locked to the frame holder 31 (released state).

The pin 23 is a protrusion protruding outward from a circumferential surface of the shaft. The frame holder 31 holds the lever 20 by covering the circumferential surface of the shaft, and a groove opening a portion corresponding to the pin 23 is formed. The groove formed in the frame holder 31 includes a first lock 31*a* (one example of a lock), a second lock 31*b*, and a slide 31*c*.

The slide 31*c* extends long in the insertion and removal direction L. The first lock 31*a* is connected to an end portion of the slide 31*c* in the insertion direction L2 side and extends about the shaft. The second lock 31*b* is connected to an end portion of the slide 31*c* on the removal direction L1 side and extends about the shaft. Widths of the first lock 31*a* and the second lock 31*b* in the insertion and removal direction L are slightly wider than that of the pin 23. That is, the frame holder 31 is formed with a square bracket-shaped groove extending long in the insertion and removal direction L, and when the user operates the lever 20, the pin 23 moves in the groove. FIG. 3 and FIG. 4 illustrate a state in which the pin 23 is positioned in the first lock 31*a* and the pin 23 is locked by the first lock 31*a*.

As described above, the lever 20 is attached to the first oscillation member 32 and, when the first oscillation member 32 rotates, is pressed by the oscillation connector 32*a* and subject to a force that causes movement in the insertion and removal direction L. More specifically, the intermediate transfer belt 61 has elasticity that maintains a constant circumferential length and, when pressed and spread by the pre-transfer roller 64 and the like, a reaction force that attempts to press these back is generated. As a result, a force that causes movement in the removal direction L1 is applied to the lever 20 via the first oscillation member 32. At this time, when the pin 23 is positioned in the first lock 31*a* or the second lock 31*b*, the pin 23 is caught, causing the lever 20 to not move in the insertion and removal direction L.

When the pin 23 is locked by the first lock 31*a*, the rotation ranges of the first oscillation member 32 and the second oscillation member 33, the operation distance of the lever 20, and the like are set, causing the pre-transfer roller 64 and the monochrome transfer roller 65 to not only come into contact with the inner periphery of the intermediate transfer belt 61 but also press the intermediate transfer belt 61 with a small load.

An interference receiver 24 protruding outward from the circumferential surface of the shaft is provided at the end portion of the lever 20 on the removal direction L1 side. The interference receiver 24 is a handle gripped when the user performs an operation, and is a portion that is subject to interference by a cover interferer 110*a* provided in the access cover 110. A positional relationship between the interference receiver 24 and the cover interferer 110*a* will be described with reference to FIG. 6 described below.

As described above, the image forming device 100 oscillates the pre-transfer roller 64, the monochrome transfer roller 65, and the color transfer rollers 66 up and down to bring the intermediate transfer belt 61 into and out of contact with the four photoreceptor drums 3 as appropriate. Thus, in the image forming device 100, by switching the positional relationship between the intermediate transfer belt 61 and the photoreceptor drums 3, color (multi-color) image formation and monochrome (single color) image formation are supported. FIG. 3 illustrates a color image forming state in which the intermediate transfer belt 61 abuts against all corresponding photoreceptor drums 3, and color image formation is implemented in the color image forming state. Further, in the image forming device 100, as illustrated in FIG. 5 described below, a monochrome image forming state in which the intermediate transfer belt 61 abuts against the photoreceptor drum 3 corresponding to the monochrome transfer roller 65 is set, and monochrome image formation is implemented in the monochrome image forming state. Furthermore, in the image forming device 100, as illustrated in FIG. 7 described below, a separated state in which the intermediate transfer belt 61 is separated from all of the photoreceptor drums 3 is set, and the attachment and detachment of the intermediate transfer unit 6 are implemented in the separated state.

FIG. 5 is a schematic side view illustrating the structure in the vicinity of the intermediate transfer unit in the monochrome image forming state.

FIG. 5 illustrates the intermediate transfer unit 6 transitioned from the color image forming state illustrated in FIG. 3 to the monochrome image forming state. As described above, the color oscillation mechanism 67 oscillates the color transfer rollers 66 upward in response to an instruction from the controller of the image forming device 100. A portion of the intermediate transfer belt 61 pressed by the color transfer roller 66 is lifted and separated from the corresponding three photoreceptor drums 3. Note that the pre-transfer roller 64 and the monochrome transfer roller 65 are maintained in a state of being oscillated downward, and thus the intermediate transfer belt 61 abuts against one corresponding photoreceptor drum 3.

In the image forming device 100, with an instruction provided to the color oscillation mechanism 67, the state is switched to the color image forming state at the time of color image formation and switched to the monochrome image forming state when the color image formation is completed. Thus, with the operation of the color transfer roller 66 being controlled by the color oscillation mechanism 67, bringing the intermediate transfer belt 61 and the photoreceptor drums 3 into and out of contact with each other in accordance with the image formation, it is possible to avoid leaving the intermediate transfer belt 61 abutting against the corresponding photoreceptor drum 3 as it is.

As illustrated in FIG. 5, in the monochrome image forming state, the regulatee 32*b* is adjacent to the regulator 101 in the insertion and removal direction L and thus, when an attempt is made to remove the intermediate transfer unit 6 itself in the removal direction L1, the regulatee 32*b* is caught by the regulator 101, regulating the removal of the intermediate transfer unit 6.

FIG. 6 is a schematic side view illustrating the structure in the vicinity of the intermediate transfer unit during transition from the monochrome image forming state to the separated state.

FIG. 6 illustrates the intermediate transfer unit 6 during the transition from the monochrome image forming state illustrated in FIG. 5 to the separated state after operation of the lever 20. When the user rotates the lever 20 about the axis thereof at the time of the transition from the monochrome image forming state to the separated state, the pin 23 moves from the first lock 31*a* into the slide 31*c*, and the lever 20 transitions from the locked state to the released state. In the released state, the lever 20 can be pulled in the removal direction L1, and the pin 23 moves to the first lock 31*c* side through the slide 31*a*. Note that the slide 31*c* has a width around an axis thereof similar to that of the pin 23 and, when the pin 23 is positioned inside the slide 31*c*, the lever 20 cannot rotate about the axis thereof.

FIG. 6 illustrates a state in which the opened access cover 110 is being closed, and a two dot chain line (trajectory KS) in the drawing illustrates part of a trajectory traced by the cover interferer 110*a* when the access cover 110 is opened and closed. With rotation of the lever 20, a protruding orientation of the interference receiver 24 from the shaft changes, and the interference receiver 24 overlaps the trajectory KS of the cover interferer 110*a*. Therefore, in a state of not being locked by the first lock 31*a*, the lever 20 interferes with the access cover 110 to be closed and prevents the closing of the access cover 110. In this way, the lever 20 interferes with the access cover 110, making it possible to prevent the access cover 110 from being closed with operation of the lever 20 being forgotten. In the present embodiment, a lower end of the access cover 110 is pivotally supported by the device main body, and the trajectory KS corresponding thereto is illustrated. However, the configuration is not limited thereto, and the positional relationship between the interference receiver 24 and the cover interferer 110*a* need only be adjusted in accordance with the opening and closing direction of the access cover 110.

FIG. 7 is a schematic side view illustrating the structure in the vicinity of the intermediate transfer unit in the separated state.

FIG. 7 illustrates the intermediate transfer unit 6 transitioned from the state illustrated in FIG. 6 to the separated state by further operation of the lever 20. At the time of the transition to the separated state, the user pulls the lever 20 in the removal direction L1 until the pin 23 reaches the second lock 31*b*. The oscillation connector 32*a* is pressed by the ring 21*a*, rotating the first oscillation member 32 and oscillating the pre-transfer roller 64 upward. Further, the second oscillation member 33 rotates in conjunction with the first oscillation member 32, oscillating the monochrome transfer roller 65 upward as well. When the state transitions to the separated state and the pre-transfer roller 64 and the monochrome transfer roller 65 oscillate upward, a portion of the intermediate transfer belt 61 pressed by the pre-transfer roller 64 and the monochrome transfer roller 65 is lifted and separated from the corresponding photoreceptor drum 3. As a result, the intermediate transfer belt 61 is separated from all of the photoreceptor drums 3. In this way, the monochrome oscillation mechanism oscillates the pre-transfer roller 64 in conjunction with the monochrome transfer roller 65 and thus, when the intermediate transfer unit 6 is inserted and removed, it is possible to reduce the time and effort of the user and keep the pre-transfer roller 64 from becoming an obstacle.

Subsequently, the user rotates the lever 20 about the axis thereof to transition the lever 20 to the locked state again. Similarly to the first lock 31*a*, when the pin 23 is locked by the second lock 31*b*, the lever 20 does not move in the insertion and removal direction L, and thus the intermediate transfer unit 6 maintains the separated state.

When the monochrome image forming state is transitioned to the separated state, as a result of the rotation of the first oscillation member 32, the regulatee 32*b* moves to a position not overlapping the regulator 101 in the insertion and removal direction L. In the state illustrated in FIG. 7, the regulatee 32*b* is positioned slightly above the regulator 101. In this state, the regulatee 32*b* does not abut against the regulator 101, making it possible to pull the intermediate transfer unit 6 in the removal direction L1.

As described above, in the present embodiment, the user operates the lever 20, causing the monochrome oscillation mechanism to switch between the monochrome image forming state and the separated state. With the monochrome transfer roller 65 being operated by the user via the lever 20, it is possible to prevent a forgotten operation by the user by the regulation of the removal of the intermediate transfer unit 6 by the regulator 101. This makes it possible to prevent the intermediate transfer unit 6 from being removed while the intermediate transfer belt 61 abuts against the photoreceptor drum 3, and the intermediate transfer belt 61 and the photoreceptor drum 3 from being damaged. Further, with the regulatee 32*b* being provided in the monochrome oscillation mechanism, even if the user mistakenly attempts to remove the intermediate transfer unit 6, it is possible to keep an object from coming into contact with the intermediate transfer belt 61.

As described above, the lever 20 is operated and moves in the insertion and removal direction L. That is, the direction in which the lever 20 is operated is the same as the direction in which the intermediate transfer unit 6 is inserted and removed, and thus the user can touch the lever 20 and the intermediate transfer unit 6 without changing position. Further, after operating the lever 20 to transition the state of the intermediate transfer belt 61, the user can continue to grip the lever 20 while maintaining the separated state and pull the intermediate transfer unit 6 out from the device main body.

Note that the embodiments disclosed herein are illustrative in all respects and are not the basis for a limited interpretation. Accordingly, the technical scope of the disclosure is not to be construed by the foregoing embodiments only and is defined based on the description of the claims. In addition, meanings equivalent to the range of the claims and all changes made within the range are included.

While there have been described what are at present considered to be certain embodiments of the disclosure, it will be understood that various modifications may be made thereto, and it is intended that the appended claim cover all such modifications as fall within the true spirit and scope of the disclosure.

What is claimed is:

1. An image forming device comprising:
a plurality of photoreceptors;
a device main body; and
an intermediate transfer unit attachable to and detachable from the device main body by being inserted into and removed from the device main body in an insertion and removal direction,
wherein the intermediate transfer unit includes
an intermediate transfer belt stretched across a plurality of rollers,
a color transfer roller and a monochrome transfer roller that are disposed along an inner periphery of the intermediate transfer belt and, when oscillated, press and cause the intermediate transfer belt to abut against each corresponding photoreceptor of the plurality of photoreceptors,
a lever operated by a user, and
a monochrome oscillation mechanism that oscillates the monochrome transfer roller,
the intermediate transfer belt is switchable between a color image forming state of abutting against all of the corresponding photoreceptors, a monochrome image forming state of abutting against a photoreceptor of the plurality of photoreceptors corresponding to the monochrome transfer roller, and a separated state of being separated from all of the plurality of photoreceptors,
the monochrome oscillation mechanism switches between the monochrome image forming state and the separated state when the lever is operated, and
the device main body is provided with a regulator that regulates removal of the intermediate transfer unit in the monochrome image forming state.

2. The image forming device according to claim 1, comprising
a color oscillation mechanism that oscillates the color transfer roller,
wherein the color oscillation mechanism switches to the color image forming state at the time of color image formation and switches to the monochrome image forming state when the color image formation is completed.

3. The image forming device according to claim 1, wherein
the monochrome oscillation mechanism includes a regulatee that faces the regulator in the insertion and removal direction in the monochrome image forming state, and
the regulatee moves to a position not overlapping the regulator in the insertion and removal direction when the monochrome image forming state transitions to the separated state.

4. The image forming device according to claim 1, wherein
the intermediate transfer unit includes a pre-transfer roller disposed along the inner periphery of the intermediate transfer belt, and
the monochrome oscillation mechanism oscillates the pre-transfer roller in conjunction with the monochrome transfer roller.

5. The image forming device according to claim 1,
wherein the lever is operated and moves in the insertion and removal direction.

6. The image forming device according to claim 1, comprising an access cover that opens and closes a side surface of the device main body and faces the intermediate transfer unit in the insertion and removal direction, and a lock that locks the lever to maintain the monochrome image forming state, wherein the lever interferes with the access cover to be closed and prevents the closing of the access cover in a state of not being locked by the lock.

* * * * *